Oct. 21, 1930.  R. T. OSMAN  1,779,142
FRAME ATTACHMENT FOR TRACTORS
Filed June 6, 1928  2 Sheets-Sheet 1
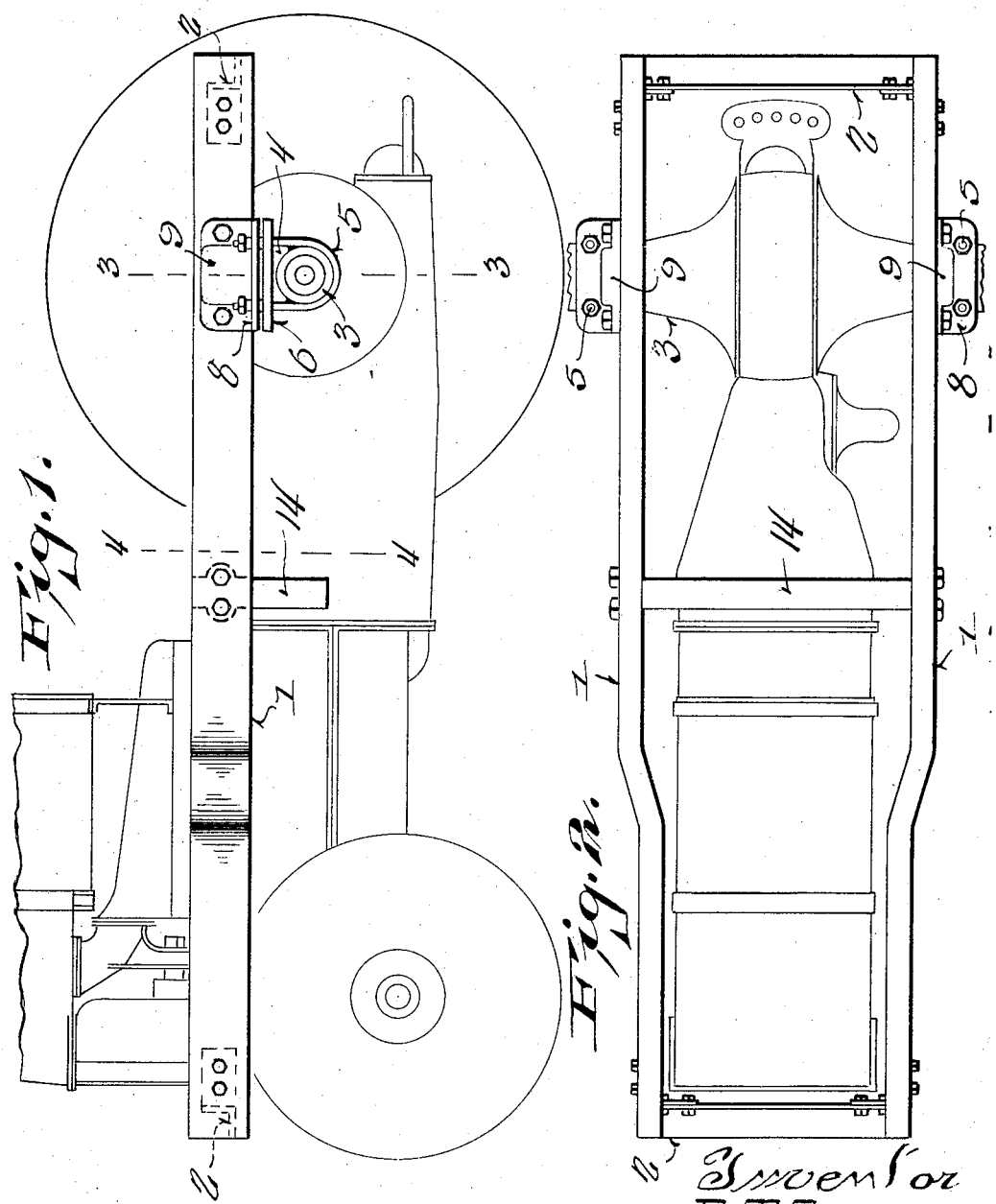

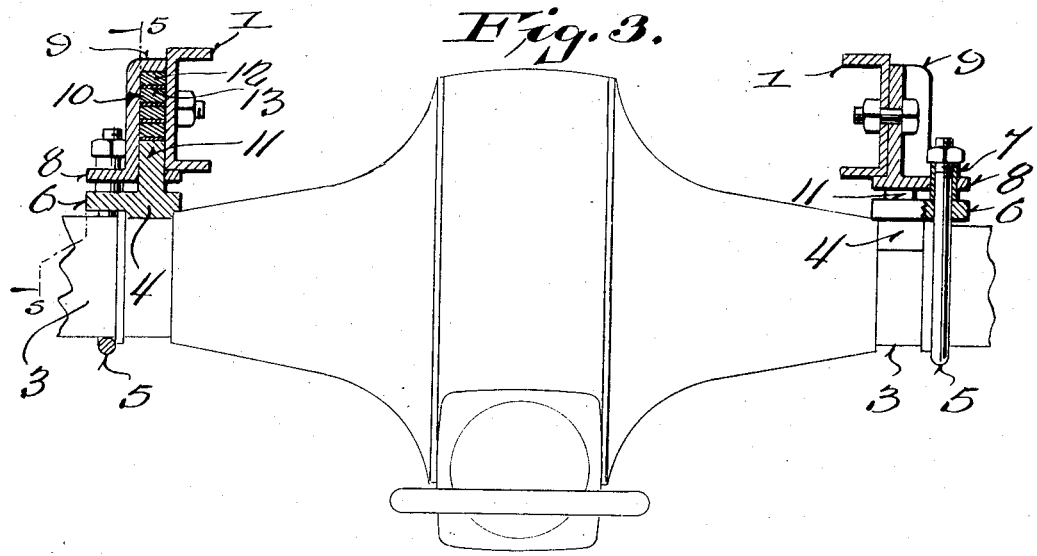
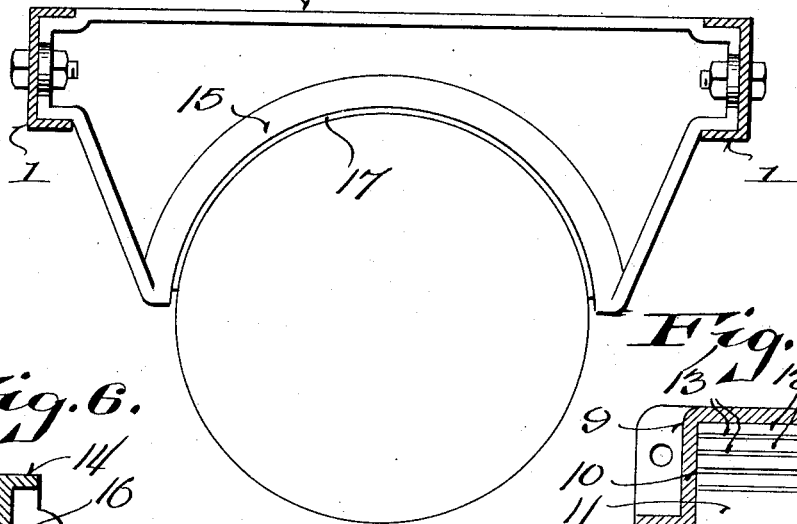
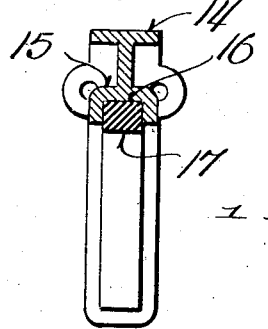
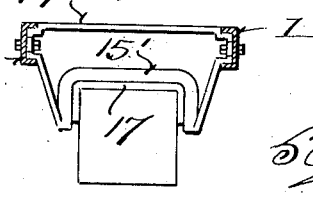
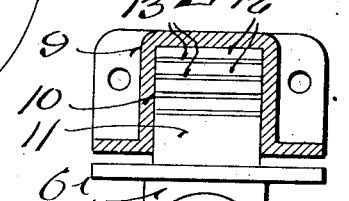

Patented Oct. 21, 1930

1,779,142

UNITED STATES PATENT OFFICE

RALPH T. OSMAN, OF MANSFIELD, OHIO

FRAME ATTACHMENT FOR TRACTORS

Application filed June 6, 1928. Serial No. 283,394.

This invention relates to frame attachments for motor-driven tractors of the type commonly known as "frameless," wherein the engine and transmission housings constitute the frame.

The frameless type of tractor has become quite popular at the present time, due to its simplicity and cheapness of structure, but because of its extreme simplicity and neatness in design, considerable difficulty has been encountered in attaching various equipment, such as dump bodies, winches, hoists, and the like.

It is therefore the primary object of the present invention to provide a simple, inexpensive, and efficient frame attachment for tractors of the frameless type, whereby they may be readily converted into load-carrying vehicles.

Incidental to the foregoing, a further object is to provide a frame attachment having a three-point support upon the tractor, thus eliminating twisting strain upon the tractor parts.

A still further object resides in the provision of novel means of attaching and cushioning the frame on the tractor.

With the above and other objects in view, which will appear as the description proceeds, the invention resides in the novel construction, combination and arrangement of parts substantially as hereinafter described and more particularly defined by the appended claim, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

Figure 1 is an elevation of the present invention applied to a tractor of conventional design, the latter being shown in light lines throughout the drawings.

Figure 2 is a plan view.

Figure 3 is a transverse section taken on the line 3—3 of Figure 1.

Figure 4 is a transverse section taken on the line 4—4 of Figure 1.

Figure 5 is a detailed section of the connection between the frame and axle housing of the tractor.

Figure 6 is a detailed section of the support between the frame and tractor housing, and Figure 7 is a view similar to Figure 4, illustrating a modification of the frame support where the invention is applied to a tractor having a rectangularly shaped transmission housing.

Referring now more particularly to the accompanying drawings, the numeral 1 designates side frame members connected at their ends by cross members 2.

In applying the present frame attachment to a tractor, the side frames are positioned upon opposite sides of the engine housing with the cross members positioned at the front and rear of the tractor. The side frames 1 are supported upon and secured to the axle housing 3, by means of saddles 4 which straddle the axle and are secured thereto by U bolts 5 passing through ears 6 projecting laterally from the saddle.

Disposed on the ends of the U bolts, above the ears 6, are sleeves 7 extending through ears 8 carried by the brackets 9 bolted to the frames 1. The brackets 9 in turn are provided with pockets 10 which slidably receive lugs 11 carried by the saddles. Disposed between the top of the lugs 11 and the top of the pockets 10 are resilient cushioning means comprising a plurality of strips 12 formed of rubber or other yieldable material, and disposed between the strips are shims 13.

It will thus be seen that while the frame members 1 are rigidly secured to the axle housing 3, the same are resiliently cushioned thereon, thus eliminating damage to the housing from excessive jar or sudden jolt, the resilient blocks 11 permitting vertical movement between the saddles and brackets 10. The advantage of providing a plurality of resilient blocks resides in the fact that a single block is more subject to splitting, which would render the cushion ineffective, whereas in the present structure, should any one of the resilient blocks split, or become damaged, the remaining blocks will function and replacement of merely a single strip is required.

The type of tractor disclosed in Figures 1 to 4, inclusive, is provided with a round transmission housing, and therefore, in order to loosely support the frame members upon the tractor, a cross member 14 in the form of a yoke is provided, which member is bolted to the side frames and provided with a seat 15 shaped to conform to and straddle the circular housing. The seat 15 is provided with a channel 16 for the reception of a cushioning member 17 formed of resilient material and adapted to engage the tractor housing.

From the foregoing it will be seen that the frame attachment is supported at three points, namely to opposite sides of the axle housing and upon the transmission housing at a point intermediate the ends of the side frames. It is obvious that because of the loose engagement between the cross bar 14 and the transmission housing, twisting strain exerted upon the frame member by excessive load, is not transmitted to the tractor housing, thus eliminating possibility of breakage and damage to the latter. It will also be appreciated that the cushioning means between the attachment to the axle housing and the support on the transmission housing will take up sudden jars or jolts.

That form of the invention disclosed in Figure 7, differs from the structure previously described only in that the tractor transmission housing is square, in which instance the yoke 14 is provided with a rectangularly shaped seat 15′ to conform to the shape of the transmission. The cushioning effect, and the elimination of twisting strain upon the housing, remains the same.

I claim:—

A frame attachment for tractors comprising a pair of side frame members extending along opposite sides of the tractor, means for securing said side frame members to the axle housing of the tractor and comprising saddles secured onto the said axle housing, lateral ears carried by said saddles, lugs carried by the saddles and extending upwardly therefrom, brackets having ears adapted to be aligned with the ears on the saddles, U-bolts embracing the axle and extending up through the ears on the saddles and brackets, sleeves mounted on the ends of the bolts, passing through the ears on the bracket and resting on the ears on the saddle, nuts on the ends of the bolts for retaining the sleeves in position, and resilient cushioning means adjusted between the lugs and the outer end of the bracket.

In testimony that I claim the foregoing I have hereunto set my hand at Milwaukee, in the county of Milwaukee and State of Wisconsin.

RALPH T. OSMAN.